United States Patent [19]
Cochran, Jr.

[11] 4,083,243
[45] Apr. 11, 1978

[54] METHOD OF MEASURING THE MASS FLOW RATE OF A SUBSTANCE ENTERING A COCURRENT FLUID STREAM

[75] Inventor: Henry D. Cochran, Jr., Lenoir City, Tenn.

[73] Assignee: The United States of America as represented by the United States Department of Energy, Washington, D.C.

[21] Appl. No.: 789,764

[22] Filed: Apr. 22, 1977

[51] Int. Cl.² ............................................ G01F 1/68
[52] U.S. Cl. ...................................... 73/196; 73/204
[58] Field of Search ................ 73/190 R, 204, 195, 73/196

[56] References Cited
U.S. PATENT DOCUMENTS

| | | | |
|---|---|---|---|
| 1,609,423 | 12/1926 | Packard | 73/190 |
| 2,647,401 | 8/1953 | Hathaway | 73/204 |
| 2,946,220 | 7/1960 | Cogniat et al. | 73/196 |
| 3,304,766 | 2/1967 | Hubby | 73/204 |
| 3,650,151 | 3/1972 | Drexel | 73/194 |
| 3,726,126 | 4/1973 | De Vittorio | 73/190 |

*Primary Examiner*—Herbert Goldstein
*Attorney, Agent, or Firm*—Dean E. Carlson; Stephen D. Hamel; Louis M. Deckelmann

[57] ABSTRACT

This invention relates to an improved method of monitoring the mass flow rate of a substance entering a cocurrent fluid stream. The method very basically consists of heating equal sections of the fluid stream above and below the point of entry of the substance to be monitored, and measuring and comparing the resulting change in temperature of the sections. Advantage is taken of the difference in thermal characteristics of the fluid and the substance to be measured to correlate temperature differences in the sections above and below the substance feed point for providing an indication of the mass flow rate of the substance.

1 Claim, 1 Drawing Figure

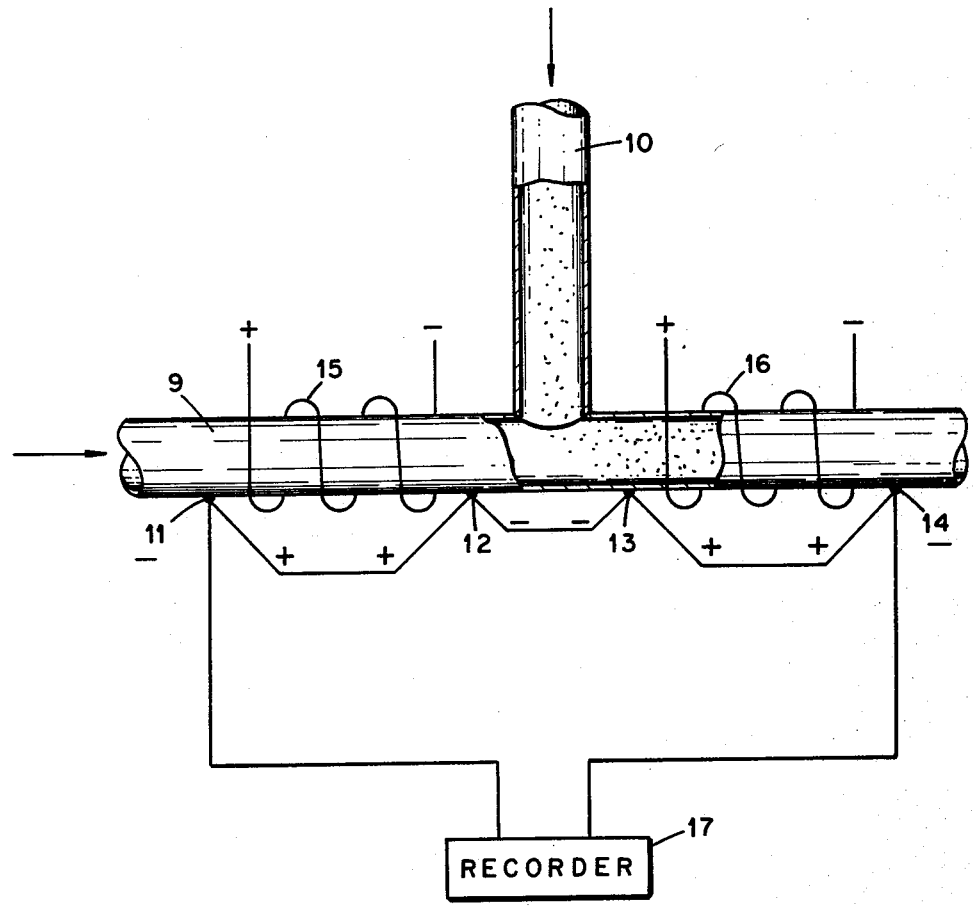

METHOD OF MEASURING THE MASS FLOW RATE OF A SUBSTANCE ENTERING A COCURRENT FLUID STREAM

BACKGROUND OF THE INVENTION

This invention was made in the course of, or under, a contract with the Energy Research and Development Administration.

In many experiments and industrial processes, it is desirable to monitor the mass flow rate of a material after it has been added to a cocurrent fluid stream without disturbing the flow of the stream. One of the best techniques of making this type of measurement is to heat a section of the stream without the substance to be monitored and determine the normal rise in temperature of the stream. This information is then used to calibrate future measurements in which the same section of the stream is heated after the substance to be monitored has been added to the stream. The difference in temperature rise between the calibrated measurements and the subsequent measurements can then be correlated to the heat capacity of the substance to be monitored thereby providing a means of determining the mass flow rate of the substance without disturbing the flow stream.

A major disadvantage of the technique described above is that it cannot compensate for changes in the composition, temperature, pressure, or flow rate of the stream without performing another calibration test.

Thus, a need exists to provide an improved method of monitoring the mass flow rate of a substance in a fluid stream based on the principles of monitoring described above whereby compensation may be made for changes in the properties of the stream. The present invention was conceived to meet this need in a manner to be described hereinbelow.

SUMMARY OF THE INVENTION

It is the object of the present invention to provide an improved method and means of monitoring the mass flow rate of a substance in a cocurrent fluid stream while at the same time effecting the compensation of any changes in the properties of the stream such as in its composition, temperature, pressure, or flow rate.

The above object has been accomplished in the present invention by providing in a method of monitoring the mass flow rate of a substance in a cocurrent fluid stream of the type involving the steps of heating a section of the stream containing the substance and determining the resulting rise in temperature in the stream wherein the improvement comprises:

(a) simultaneously heating an equal section of the stream above the entry point of the substance to be monitored;

(b) determining the resulting rise in temperature in the stream above said entry point of the substance;

(c) determining the differences between the change in temperature in the stream above and below the entry point; and (d) thermodynamically correlating the difference in upstream and downstream temperatures to provide an indication of the mass flow rate of the substance to be monitored.

BRIEF DESCRIPTION OF THE DRAWING

The single FIGURE is a schematic illustration of the present invention.

DESCRIPTION OF THE PREFERRED EMBODIMENT

The present invention may be used to monitor solids or liquids transported cocurrently in a liquid or gas transport stream. However, for simplicity of discussion, the preferred embodiment will be directed to the monitoring of solid particles in a gas stream.

Referring now to the single FIGURE, a fluid transport line 9 is provided with identical heaters 15, 16 upstream and downstream of the point of entry of solids which are introduced into the fluid stream of line 9 by means of a solids feed line 10. Two pairs of thermocouples 11,12 and 13,14 are attached to the transport line 9, one thermocouple (11,13) upstream of each heated section, and one (12,14) below each heated section. Each pair of thermocouples is wired in series as shown in the FIGURE so that the temperature difference caused by only gas flow is substracted from the temperature difference caused by gas and solids flow. The net output then is a signal which is recorded by a recorder 17 and which depends substantially on the solids flow rate only and disregards (compensates for) any change in gas properties.

In order to calibrate the flow monitor for use with any fluid transport stream and feed substance, a procedure such as the outlined below should be made:

Step 1 — Supply equal amounts of electrical power to heaters 15 and 16 with transport line 9 and feed line 10 closed.

Step 2 — Locate thermocouple 11 upstream from heater 15 such that the thermocouple gives a temperature reading that is above ambient temperature by a preselected amount.

Step 3 — Locate thermocouple 12 downstream from heater 15 in electrical opposition to thermocouple 11 such that the voltage difference between thermocouples 11 and 12 is approximately zero.

Step 4 — In a likewise manner, locate thermocouples 13 and 14 on respective opposite sides of heater 16 such that each thermocouple reads the same temperature and has a net voltage difference of zero.

Step 5 — Then, with heaters 15 and 16 operating and a fluid stream flowing through transport line 9, feed the substance to be monitored at known rates through the feed line 10 to correlate changes in voltage across the thermocouples to changes in feed rates of the substance.

After calibration of the device has been accomplished, the flowmeter can be installed in a process line for regular use.

Advantages of the above described system over commercially available units include:

(1) The method compensates for changes in the composition, flow rate, pressure, or temperature of the transport stream;

(2) No penetration of the flow system is required; and (3) The apparatus necessary to implement the method is relatively simple and inexpensive.

The above-described method and system can be applied in a variety of flow situations where one phase is added to or removed from another. Because solids flow is normally difficult to measure by prior art techniques, the present system lends itself for use with solids feeders or solids separators. One present use of the present system is on a bench-scale coal conversion process at the Oak Ridge National Laboratory.

The present invention has been described by way of illustration rather than by limitation and it should be apparent that it is equally applicable in fields other than those described.

What is claimed is:

1. A system for monitoring the mass flow rate of solid particles in a cocurrent fluid stream comprising a fluid transport line, a feed line coupled to said fluid transport line for introducing solid particles into said transport line, a first electrical heater encompassing a section of said transport line upstream from said particles feed entry line, a second electrical heater encompassing a like section of said transport line downstream from said particles feed entry line, said heaters adaptable to be supplied with respective equal heating currents, a first pair of thermocouples affixed to said transport line on respective opposite sides of said first heater and connected in electrical opposition each with the other, a second pair of thermocouples affixed to said transport line on respective opposite sides of said second electrical heater and also connected in electrical opposition each with the other, a recorder, and means for connecting all of said thermocouples in series with each other and with said recorder, whereby when said heaters are energized the difference in temperatures as sensed by said respective pairs of thermocouples provides an indication of the mass flow rate of said particles in said fluid stream and is recorded by said recorder.

* * * * *